(12) United States Patent
Voit et al.

(10) Patent No.: US 10,779,672 B2
(45) Date of Patent: Sep. 22, 2020

(54) METHOD FOR RAPID COOKING OF GROUND MEATS AND FAT SEPARATION

(71) Applicant: BLENTECH CORPORATION, Santa Rosa, CA (US)

(72) Inventors: Daniel Voit, Santa Rosa, CA (US); Zhengjun Xue, Santa Rosa, CA (US)

(*) Notice: Subject to any disclaimer, the term of this patent is extended or adjusted under 35 U.S.C. 154(b) by 310 days.

(21) Appl. No.: 15/297,954

(22) Filed: Oct. 19, 2016

(65) Prior Publication Data

US 2017/0105567 A1 Apr. 20, 2017

Related U.S. Application Data

(60) Provisional application No. 62/243,626, filed on Oct. 19, 2015.

(51) Int. Cl.
| | |
|---|---|
| *A47J 27/04* | (2006.01) |
| *A47J 27/00* | (2006.01) |
| *A47J 36/00* | (2006.01) |
| *A23L 5/10* | (2016.01) |

(52) U.S. Cl.
CPC .............. *A47J 27/002* (2013.01); *A23L 5/13* (2016.08); *A47J 36/00* (2013.01); *A47J 2027/043* (2013.01)

(58) Field of Classification Search
CPC ......... A47J 27/00; A47J 27/002; A47J 27/04; A47J 27/043; A23L 13/00; A23L 13/67; A23L 13/60
USPC ......... 99/324, 444, 445, 446, 325, 330, 336; 426/417, 480, 478, 438; 219/401
See application file for complete search history.

(56) References Cited

U.S. PATENT DOCUMENTS

| | | | | |
|---|---|---|---|---|
| 3,872,716 A | * | 3/1975 | Hansen | G01N 3/42 73/81 |
| 3,897,723 A | * | 8/1975 | Lucy, Jr. | A22C 5/00 99/467 |
| 4,846,054 A | * | 7/1989 | Mange | B30B 9/16 99/495 |
| 5,397,585 A | * | 3/1995 | Abernathy | A23L 13/67 426/417 |
| 5,405,632 A | * | 4/1995 | Mahboob | A23L 13/00 426/243 |
| 5,622,101 A | * | 4/1997 | Margolis | C11B 1/102 99/403 |
| 5,652,012 A | * | 7/1997 | Margolis | A23L 13/426 426/417 |

(Continued)

*Primary Examiner* — Lorne E Meade
*Assistant Examiner* — Ayub A Maye
(74) *Attorney, Agent, or Firm* — Craig M. Stainbrook; Stainbrook & Stainbrook, LLP

(57) ABSTRACT

A system and method for cooking meat and thereafter removing liquefied fat from the cooking vessel, including a horizontally disposed cooking vessel having an interior cooking chamber, a top cover, at least one reversible ribbon agitator in an agitator trough; a plurality of steam injectors disposed in a lower portion of said agitator trough and in fluid communication with said agitator trough; a sensor system having sensors and programmed to detect and differentiate the location and depth of layers of liquified fat, emulsion, and water within said cooking chamber; a plurality of extraction funnels disposed in an overhead portion of said cooking chamber; and an extraction funnel motor and drive system for moving said extraction funnels up and down within said cooking chamber.

12 Claims, 8 Drawing Sheets

(56) References Cited

U.S. PATENT DOCUMENTS

| | | | |
|---|---|---|---|
| 5,837,310 A | 11/1998 | Margolis | |
| 6,017,576 A * | 1/2000 | Klossner | A23J 3/227 |
| | | | 426/511 |
| 6,125,738 A * | 10/2000 | Poister | A47J 27/04 |
| | | | 126/369 |
| 6,213,002 B1 * | 4/2001 | Batten | B01D 17/0208 |
| | | | 99/340 |
| 6,487,962 B1 | 12/2002 | Horn | |
| 8,568,813 B2 * | 10/2013 | Garwood | A22C 17/08 |
| | | | 426/480 |
| 2012/0222563 A1 * | 9/2012 | Horn | A47J 27/04 |
| | | | 99/447 |

\* cited by examiner

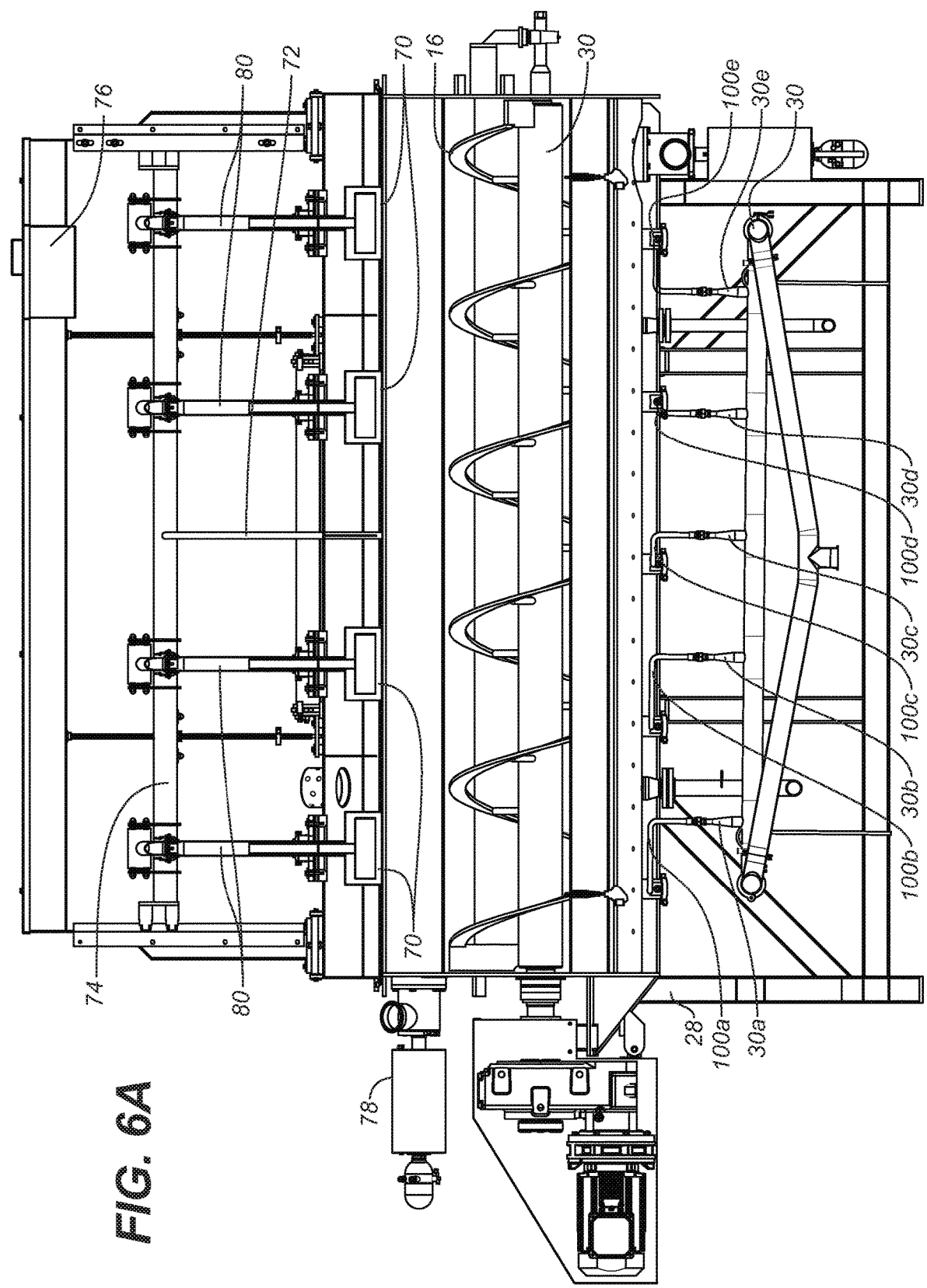

ND FAT SEPARATION

METHOD FOR RAPID COOKING OF GROUND MEATS AND FAT SEPARATION

CROSS REFERENCES TO RELATED APPLICATIONS

The present application claims the benefit of the filing date of U.S. Provisional Patent Application Ser. No. 62/243,626, filed Oct. 19, 2015 (Oct. 19, 2015), which application is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The invention relates generally to commercial cooking systems, and more particularly to a commercial meat cooker, and still more particularly to a method and system for cooking ground meat products and removing useful and reusable liquefied fat from the cooked meat product.

Background Discussion

U.S. Pat. No. 5,837,310, to Margolis ("Margolis '310") describes a fat removal system decreasing the fat content of cooked ground beef. This system offers unique economic value in that high fat beef which is lower in cost can be used to produce a low fat cooked, seasoned beef product. Additionally, it pioneered a method of accurately controlling the fat content of cooked ground beef for applications such as taco style meats.

The system patented and commercialized by Margolis has been in use by many companies in the food processing industry for 20 years. It is a cornerstone for ground beef production. Tallow produced in the prior art Margolis '310 process contained a great deal of water, seasoning and solubilized protein. Curiously, during the time over which Margolis has been the dominant system design, those with skill in the industry have entirely failed to identify and implement process improvements.

BRIEF SUMMARY OF THE INVENTION

The system and method of the present invention are improvements over the Margolis '310 system. The inventive concept combines several innovative technologies and processes never before employed or combined in the food industry.

Features and advantages of the inventive system include: (1) direct steam injection cooking of the meats increases particulate size of the final cooked meat, yielding a more desirable texture; (2) direct steam injection cooking of the meat results in increase production capacity; (3) cooking with direct steam injection increases the usable life of the equipment by lowering thermal stresses on the jacket and body of the cooker; (4) cooking with direct steam increases the capacity of the equipment by reducing cycle times; (5) injection of separation water from direct steam injection manifolds from below eliminates the formation of an emulsion later allowing for precise separation of fat and water; and (6) a precise separation that allows for removal of up to 5% more fat than the process described in the Margolis '310 but is more repeatable and controllable.

The system and method of the present invention provide and/or produce: (1) edible tallow; (2) high purity tallow with low moisture low protein loading which improves rendering efficiency; (3) product with little to no spice carry over; (4) precise automatic and repeatable detection of the layer of fat and water through measurement of conductivity.

BRIEF DESCRIPTION OF SEVERAL VIEWS OF THE DRAWINGS

FIG. 6A is a cross sectional side view in elevation showing the extraction funnel array in a home (elevated) position.

DETAILED DESCRIPTION OF THE INVENTION

Figure 1:
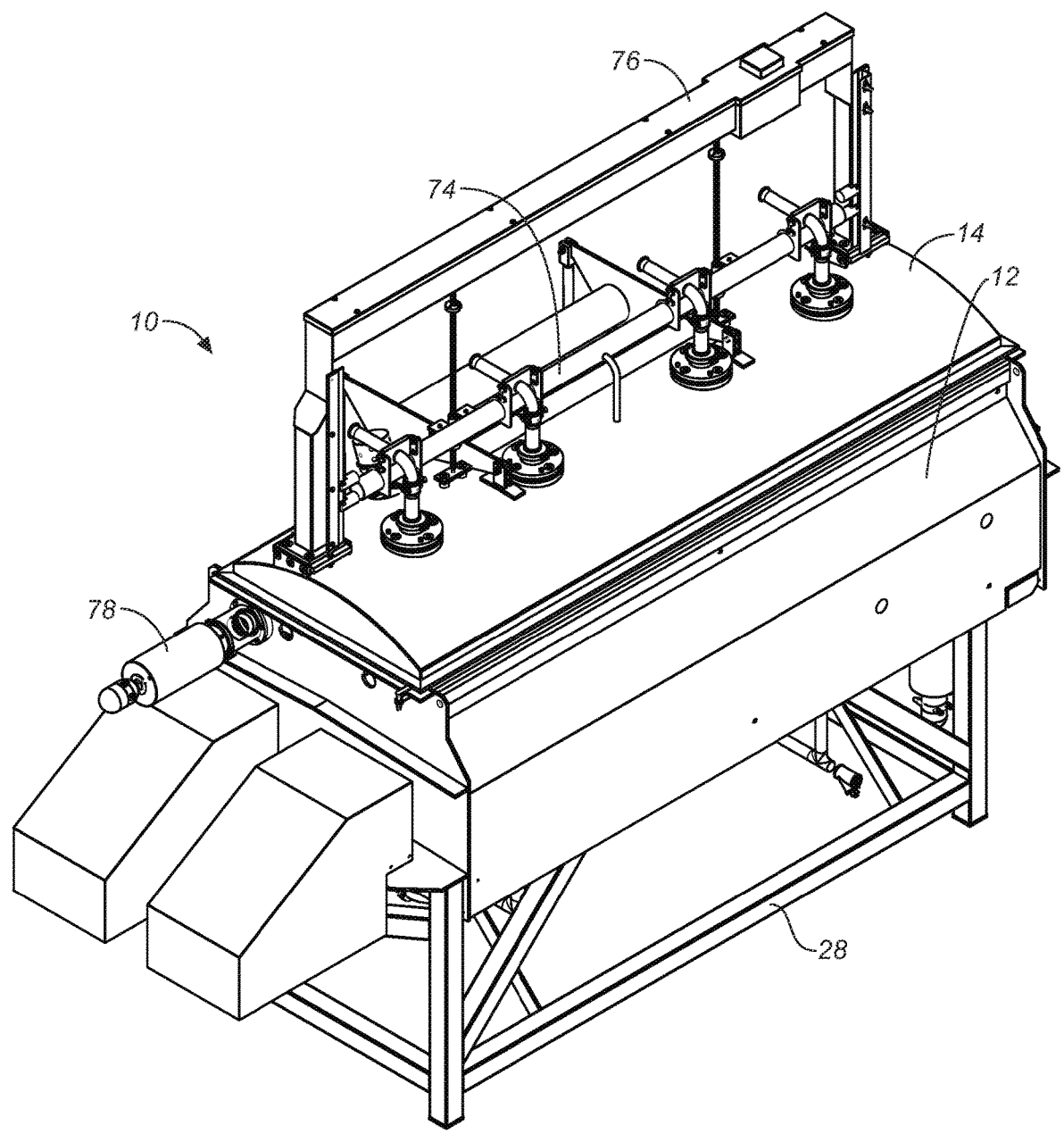
FIG. 1 is a upper right front end perspective view showing a horizontally disposed batch cooker in which embodiments of the inventive system are implemented.
Figure 1A:
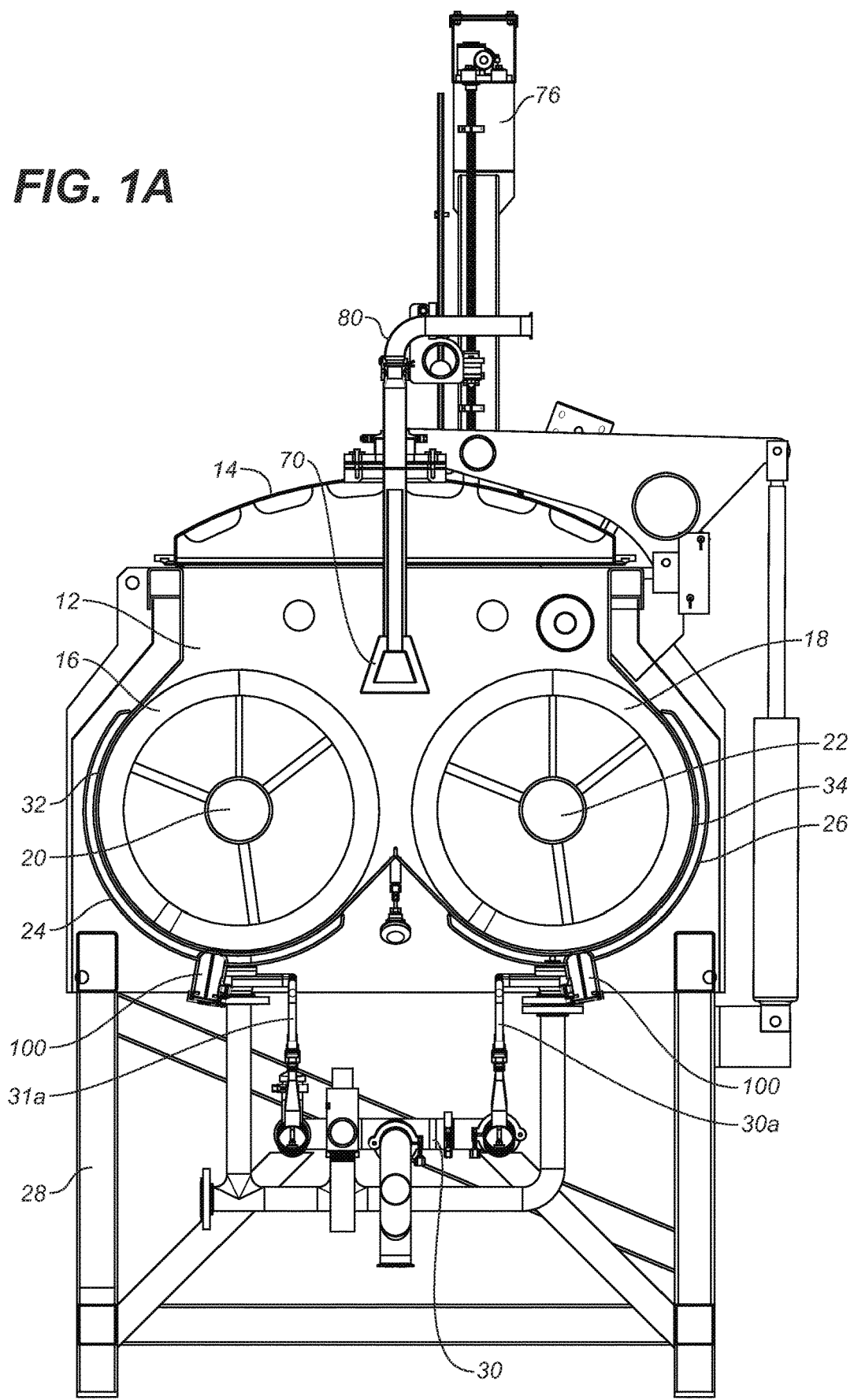
FIG. 1A is a rear end view in elevation of the horizontally disposed batch cooker (shown here with an end panel removed to feature the internal ribbon agitators) including a sanitary direct steam injection ("DSI") system.

Referring to FIGS. 1 through 6B, there is illustrated therein embodiments of a new and improved system for rapid cooking of ground meats and fat separation.

Embodiments of the present invention are utilized (installed or implemented) in a horizontally agitated batch cooker, such as the Blentech VersaTherm, information and specifications for which can be found at http://www.blentech.com/product-item/versatherm/. The system information and specifications may be understood as systems in which the newly developed system may be implemented. An early iteration of the operational components is described and disclosed in commonly owned U.S. Pat. No. 6,487,962, which is also incorporated in its entirety by reference herein.

In general terms, the cooking vessel employed in the present invention includes a horizontally disposed cooking vessel 10, having an interior cooking chamber 12 with a hinged water tight cover 14. Reversible ribbon (screw auger) agitators 16, 18, have their respective drive shafts 20, 22, disposed generally parallel to one another in side-by-side troughs 24, 26. The cooking vessel is elevated on a frame 28.

Figure 1B:
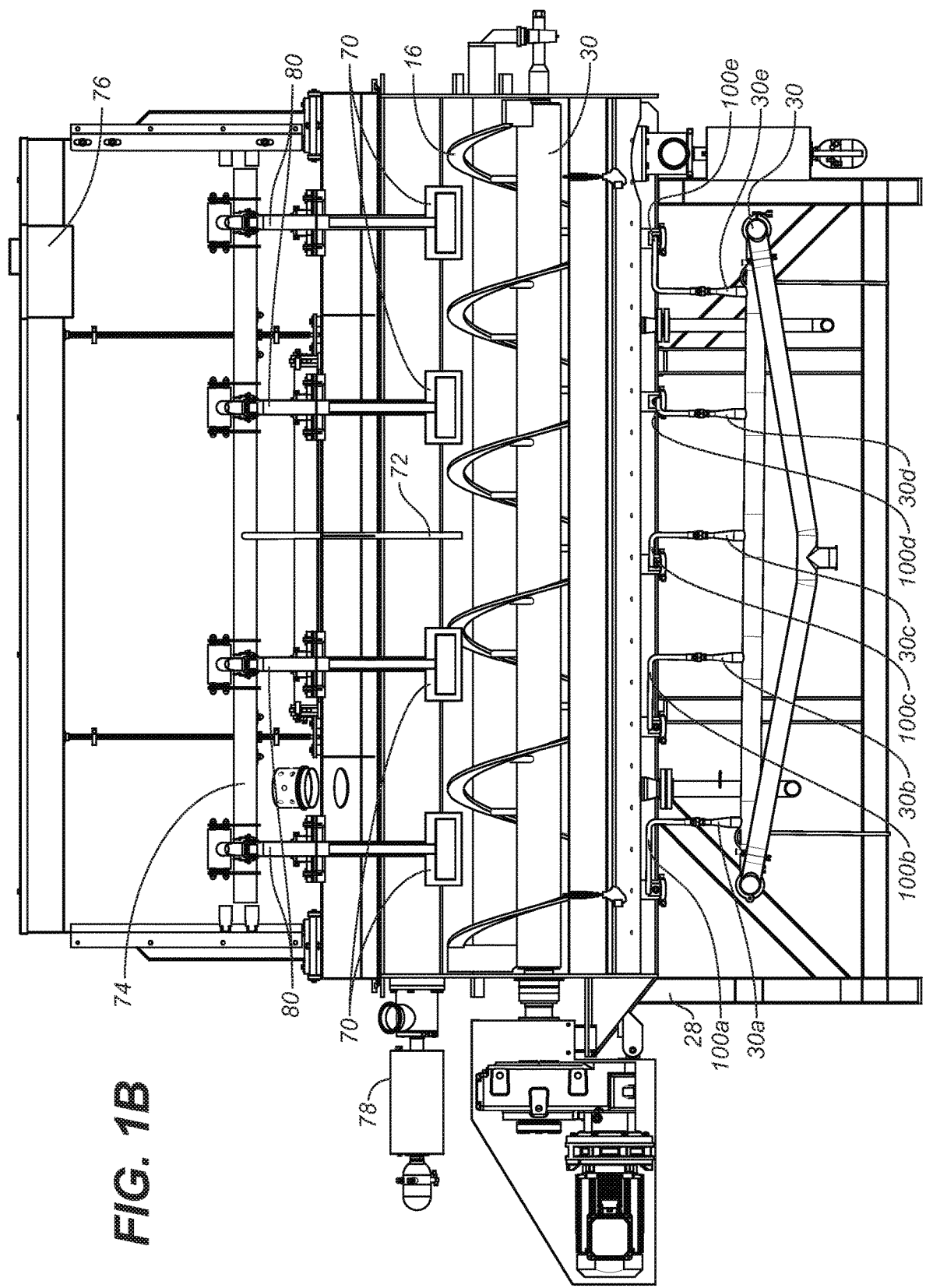
FIG. 1B is a cross-sectional side view in elevation thereof.
Figure 2A:
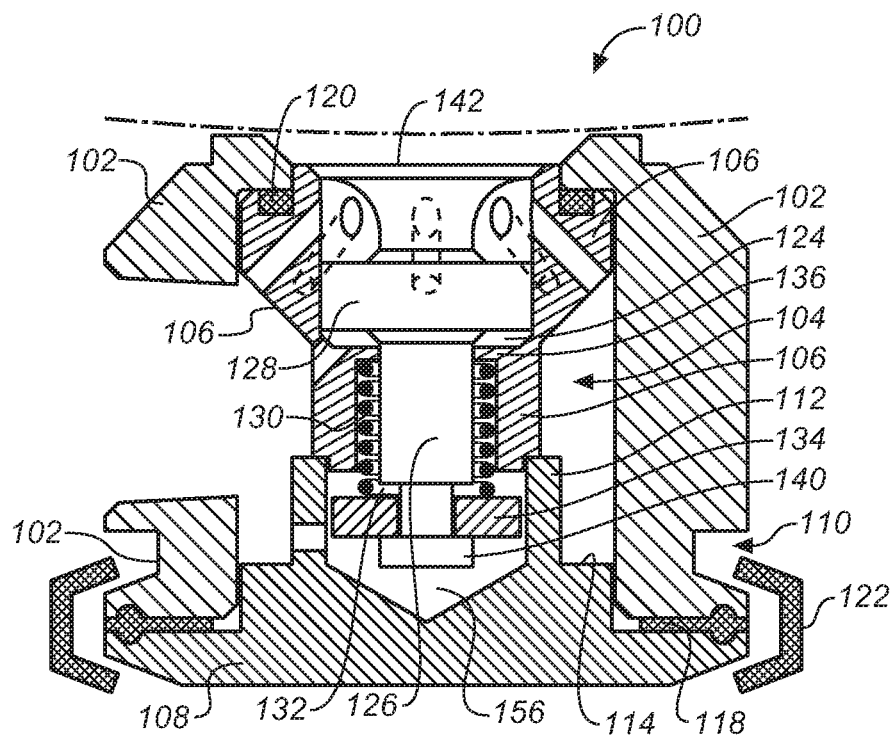
FIG. 2A is cross-sectional side view in elevation of the improved low pressure, low velocity steam injector as used in the present invention, this view showing the valve in a closed (seated) position.
Figure 2B:
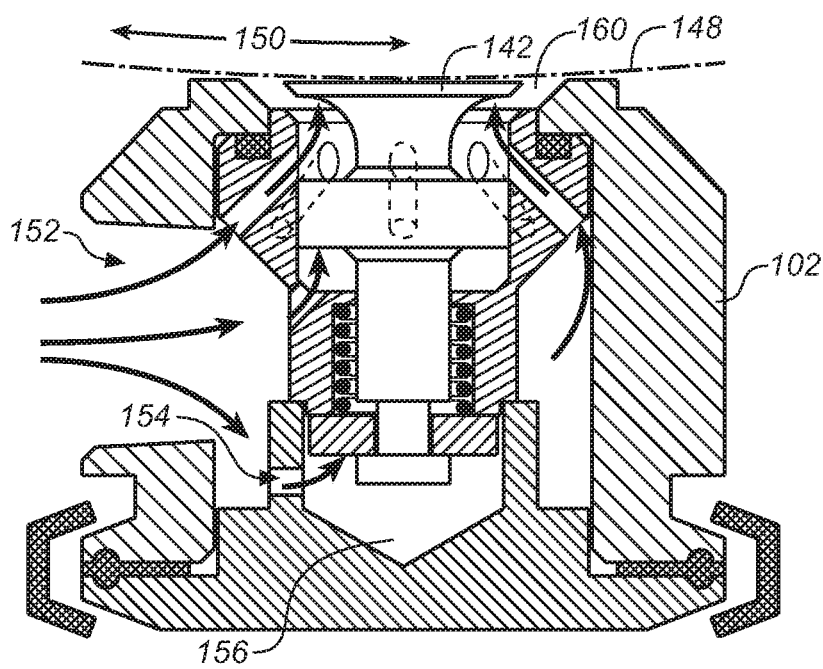
FIG. 2B is the same view showing the valve urged into an operated (unseated) position and the steam flow path through the valve assembly.
Figure 2C:
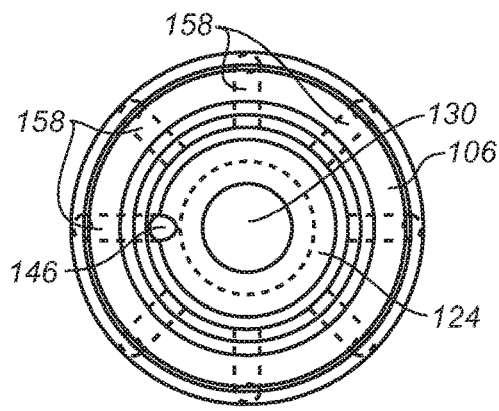
FIG. 2C is a top plan view thereof, showing the improved valve seat and steam injection hole configuration.
Figure 2D:
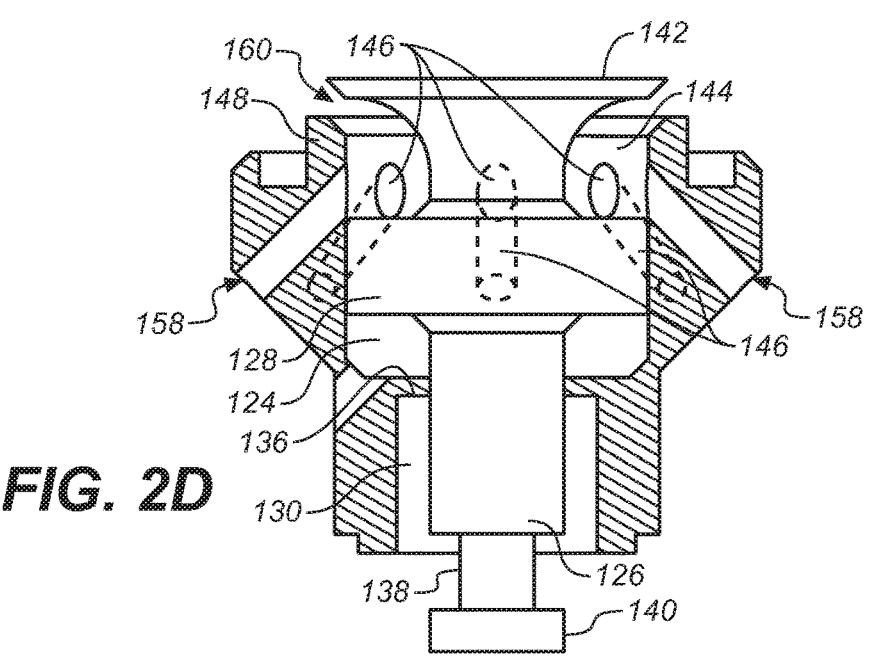
FIG. 2D is a detailed cross-sectional side view in elevation of the steam injector of FIGS. 2A through 2C shown with the valve seat and valve body removed from the valve housing.

In an embodiment, the present invention includes a specialized sanitary direct steam injection ("DSI") manifold (or main distribution header) 30 disposed underneath the cooking chamber 12 and from which steam and/or hot water is injected through direct steam injectors 100 into the lower portion of the troughs. Steam jackets 32, 34 enclose a portion of the troughs and run substantially the entire length of the troughs. Steam from the steam supply is delivered to the steam jackets from a common header as well as to the direct steam injectors. The system configuration is depicted in FIG. 1, which shows a DSI manifold placement for maximum control of fat separation process. Referring to FIG. 1B, there is shown the placements for five injectors 100a, 100b, 100c, 100d, 100e, enclosed in the lower cooker portion, each fed by a steam pipe 30a, 30b, 30c, 30d, 30e, rising off the distribution header 30. In a system with side-by-side parallel agitator screws in side-by-side troughs, this array is matched with a second array in the second trough.

Referring next to FIGS. 2A through 2D, after adding meat to the cooker, steam is injected through "spring tensioned" and "spring-to-close" injectors designed specifically to reduce turbulence and thereby minimize any emulsifying effect. Because all commercially available direct steam injection systems are designed for rapid cooking, and because they are commonly used to cook emulsion products such as formulated, processed cheese, the present invention includes a unique direct steam injection nozzle.

In particular, in an embodiment, the steam injection nozzle is spring tensioned to close at low pressures but still allows continuous smooth adjustment of flow through balanced pressures from the header. The injectors begin to open at 2 psi and are fully open at 15 psi. The flow pattern emitting from the nozzle has a relatively continuous velocity gradient (see both FIGS. 2 and 3).

Referring still to FIGS. 2A through 2D, there is illustrated therein an embodiment of the low pressure, low velocity steam injector, generally denominated 100 herein. This valve is the subject of commonly owned U.S. patent application, Publication No. 2012/0222563, the entirety of which is incorporated by reference herein.

The steam injector 100 includes a cylinder housing 102 having an interior void 104 in which a valve seat 106 is disposed. An end cap 108 is placed over a lower open end 110 of the housing 102 and captures the valve seat between an end cap cup 112 disposed on the interior side 114 of the end cap and upper interior rim 116. A sanitary gasket 118 is disposed between the end cap and the housing, and an O-ring seal 120 is disposed between the valve seat and the upper interior rim. An annular clamp 122 secures the end cap 108 to the first end 110 of the housing 102.

The movable element in the assembly is the valve body, which generally comprises a valve stem 126 and valve head 146. However, an upper portion of the valve stem of the present invention has been significantly modified to include a coaxially disposed annular pressure piston 128. The valve seat 106 therefore includes an internal cylindrical through bore (cylinder) having an upper portion 124 with a diameter sufficient to accommodate the pressure piston 128, which is sized with close tolerances in relation to the cylindrical side of the upper portion 124 of the through bore. The through bore also includes a lower portion 130 with a diameter slightly smaller than the upper portion, yet large enough to accommodate a spring 132 coaxially disposed around the lower stem portion of the valve body. The spring is interposed between a stem seal 134 (or stem lock washer) and a ledge 136 dividing the first portion from the second portion of the through bore. The stem seal is disposed around a lower stem extension post 138, which is terminated by an expanded head 140.

The valve head 142 is securely sealed atop a cylindrical exhaust chamber 144, around which are disposed a plurality of exhaust ports 146 angling inwardly and upwardly through the uppermost portion 148 of the valve seat to openings in the exhaust chamber. These exhaust ports direct steam to the underside of the valve head, and when the valve is in the operated position, through the vessel shell 148 and into the cooking chamber 150 (ref no. 12 as seen in FIG. 1).

The housing 102 includes a steam inlet port 152 coupled to a steam supply from a manifold. One or more pressure transfer holes 154 are disposed in both the end cap cup 112 and in the valve seat immediately under the pressure piston to provide a steam flow path for steam into the cup interior 156 under the stem seal 134 and under the pressure piston 128. Exhaust ports 146 include steam inlet holes 158 disposed in the valve seat so as to provide a steam flow path to and through the exhaust ports 146 to the underside 160 of the valve head 142.

In operation, the low pressure steam injector receives steam from the steam supply source and transfers the steam through pressure transfer holes in the end cap cup 112 into the piston chamber below the pressure piston to open the valve. The pressure of the steam in the piston chamber is equalized with and thus the same as the steam supply pressure. The surface area of the pressure piston on which the steam pressure is applied is sufficient to compress the closure spring and open the valve at very low static pressures, thus preventing spring flutter and premature spring failure. The steam pressure against the pressure piston is also sufficient to increase the area of the orifice gap 160. However, the pressure in the exhaust chamber above the pressure piston is reduced, thereby releasing the steam into the product at a lower pressure. Because the pressure piston is forced wide open, the orifice gap is large even at low steam pressures, and the velocity of the steam released into the product is very low.

The steam from the steam supply source also passes through a series of exhaust ports 148 into the exhaust chamber 144 above the pressure piston 128 and is then injected into the food product. The exhaust ports are designed to create a pressure drop between the steam supply source and the exhaust chamber since the steam valve is fully open to atmosphere in the product vessel. The flow of steam from steam exhaust ports into the exhaust chamber and thereafter into the product vessel assures that the injection pressure is always lower than the pressure in the piston chamber regardless of the steam supply pressure. Therefore, the steam supply pressure can be adjusted so that the valve is fully open, yet the steam flowing into the product is at a suitably low pressure, temperature, and velocity, thus significantly reducing the damage to fragile products being heated.

Figure 3:
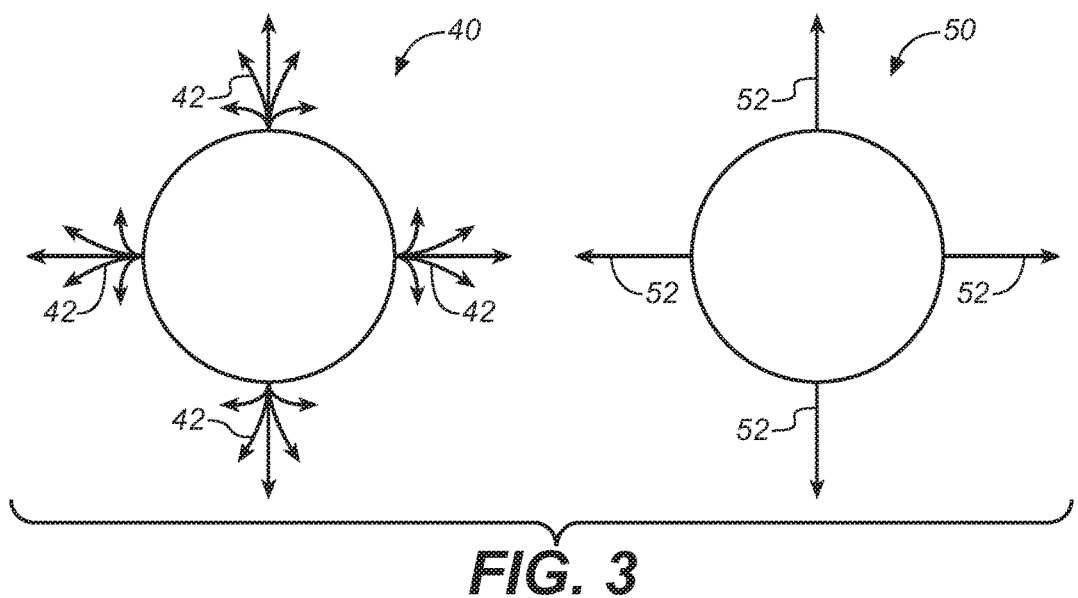
FIG. 3 includes two highly schematic top plan views comparing steam velocities from steam injectors, the left view showing the turbulent flow as created by a standard injector, the right view showing the low shear design of the present invention, which results in lower turbulence and decreased emulsion formation.

Thus, and referring now to both FIGS. 2A-2D and FIG. 3, steam flow can be controlled relative to a product weight or to a final temperature, but it is most precisely controlled to a product weight, which allows for comparatively simpler automation of the subsequent processes. FIG. 3 shows in a highly schematic comparative illustration the steam velocities from steam injectors. The view on the left 40 shows the turbulent flow 42 of the kind created by a standard steam injector. The comparative view on the right 50 shows the low shear design achieved by embodiments of the present invention, which results in lower turbulence 52 and decreased emulsion formation.

As a result of the foregoing operational features and functions, the temperature of the cooked meat may vary between cycles after completion of the direct steam injection process, but it is always below 165° F., which is the temperature threshold for the legal definition of cooked meats. For this reason, the process also employs a steam jacket used to complete the heating process to a repeatable, final set point. In most cases, this is again 165° F., at which point fat has been rendered and the meat has been cooked.

Moreover, embodiments of the present invention employ reversible scrapers fabricated from a hydrophobic injection molded sanitary polymer, such as polypropylene. The structural features combined with the materials from which the structures are fabricated result in increased heat transfer and also reduce cleaning time, since the hydrophobic nature of the polymer repels soluble proteins and in turn reduces clean-up time.

Because the injectors are spring-to-close in type, they reduce the flow of material into the header. However, some flow is unavoidable in practical day-to-day use, and the header is therefore designed as a sanitary component of the system. In addition to exploiting the advantages of a clean-in-place design, embodiments of the inventive system are easily and rapidly cleaned between each cycle through the addition of separation water.

Figure 4:
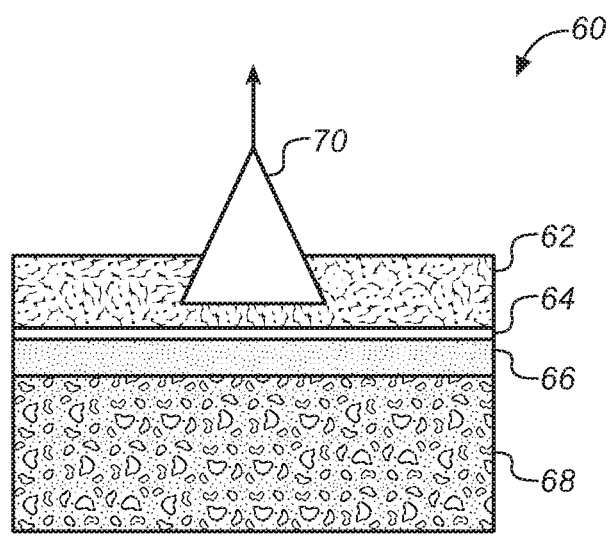
FIG. 4 is a highly schematic cross-sectional side view in elevation of showing the fat, transition and water layers detectable by the automatic control system of the present invention, which facilitates precision, automatic, and repeatable positioning of the extraction funnels and adjustment of batch size not possible in the prior art systems.

Looking now at FIG. 4, there is shown in a highly schematic cross-sectional side view in elevation the precisely structured layers of compounds 60 present in the cooking chamber during a cooking cycle. There is seen a fat layer 62, a transition layer 64, and a water layer 66, all of which are created above the meat and water layer 68 of the cooked food product. The upper layers are detectable by an automatic control system, which facilitates precise, automatic, and repeatable positioning of extraction funnels 70 and adjustment of batch size, none of which is possible using prior art systems.

When a final cook temperature is achieved, water is automatically metered carefully into the cook chamber through the steam injectors 100. The water is introduced at a temperature at or above 165° F. to "float" the rendered fat from below. This eliminates turbulence and mixing, which in turn accomplishes a more precise separation in which the fat layer can easily be skimmed. Known prior art processes, exemplified by Margolis '310, require mixing and agitation to distribute water, which is added through funnels or ports overhead. The addition of this water results in formation of a weak emulsion layer. This is partially overcome by the process of waiting for the fat to coalesce. Margolis '310 describes this to require 6-7 minutes. By contrast, embodiments of the presently inventive process eliminate this waiting period because emulsions are not formed to the same degree, and the process is able to remove up to 5% more fat than the process described by Margolis. In addition, the fat removed does not contain residual seasoning, has less soluble protein and less water. Moreover, it is edible. This increases the sale value and reduces the environmental impact of the process. For example, when the tallow is transferred to a rendering plant, energy is required to boil away water bound in the fats. Because the harvested tallow has a greater purity, less energy is required to complete this process. Although this also increases the profitability of the process, it also has a profoundly positive environmental impact.

After the fat is floated to the surface, a movable header or super structure is lowered into the cooker using a plurality of specially designed funnels that nest between the tightly spaced agitators. The depths to which the funnels are lowered (the suction positions for the funnels) are determined automatically through a sensor system that includes conductivity sensors 72 for detecting and measuring the conductivity of the fluid rendered. Density sensors (not shown) may be co-located with the conductivity sensors. Before the fat and water are extracted, the extraction funnels are lowered from a home position to a lowest position using an extraction (vacuum) header 74 raised and lowered with a worm screw drive 76 under control of a motor and programmable encoder (co-located) which receives data from the conductivity and density sensors and measures the depth to which the funnels have been lowered. As can be seen, each funnel is in fluid communication with the extraction header 74 through an extraction tube 80.

In the extraction process, the conductivity and the density of the liquid layers are measured continuously and analyzed against the distance traveled. As a result, there are obtained distance vs conductivity and distance vs. density curves. The positions where the conductivity includes large changes signifies interfaces between different layers. The density sensor works largely the same way. Because fat has a relatively lower conductivity and a lower density than water, the automatic control system can detect and distinguish the interface layer start, the transition later, and the water layer; that is, the fat, emulsion, and water layers (see FIG. 4). This allows for precise, automatic, and repeatable positioning of the extraction funnels 70, and, in turn, facilitates adjustment of batch size. Precise measurements make it possible to run discrete processes to remove fat first, then water. After processing and solution extraction, the funnels are returned to the home position, which is in a longitudinally oriented array in an upper portion of the cooking chamber.

Figure 5:
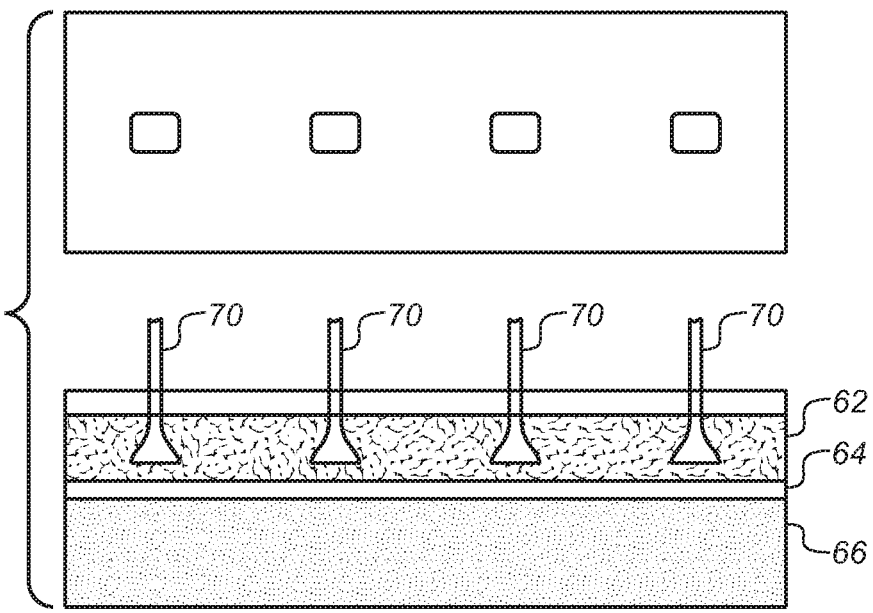
FIG. 5 is a highly schematic cross-sectional view in elevation showing the fluid extraction funnels set in a linear array.
Figure 5A:
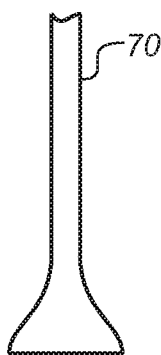
FIG. 5A is a side view in elevation showing the configuration of a single extraction funnel.
Figure 6B:
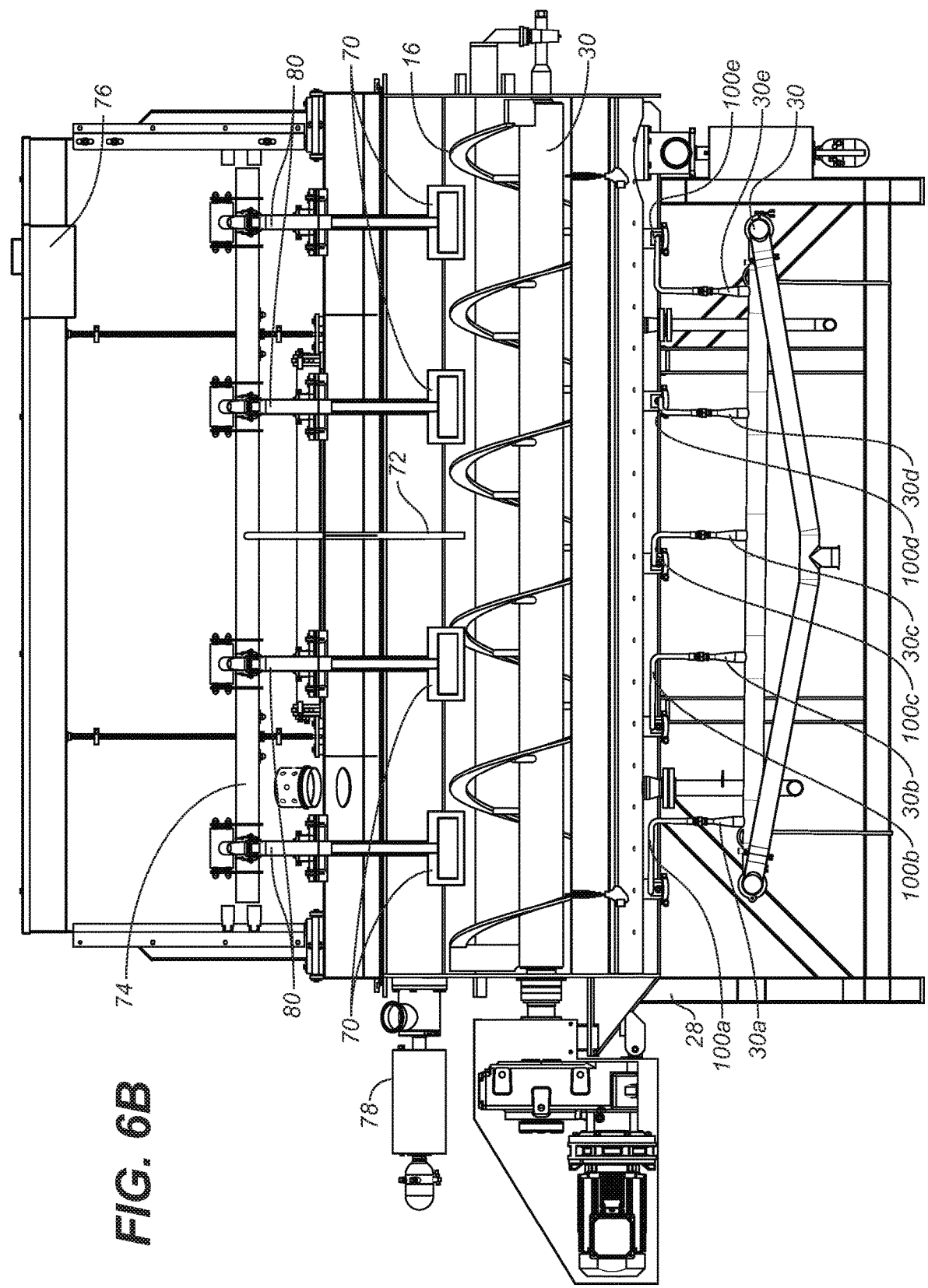
FIG. 6B is the same view showing the funnel array lowered into the cooking vessel.

To further improve the performance of the system, embodiments of the present invention optimize the design of extraction funnels (include configuration and contours) to discourage emulsification; this, in turn, further improves fat separation. This optimization (shown in FIGS. 5-5A) shows that embodiments of the present invention include a funnel system that allows for closer mixer spacing, and its computational fluid dynamics ("CFD") contoured design reduces flow induced turbulence or emulsification in the extraction process. The result is the establishment and maintenance of the above-mentioned precise separation of tallow even during the fat removal process.

The shape, size and number of the suction ports and extraction funnels can be optimized based on the size of the cooker and the physical properties of the tallow. In preferred embodiments, the shape of the funnel mouth is a bell-shaped curve. The goal is to minimize the velocity gradient across the funnel cross section and therefore reduce the degree of mixing while maximizing the suction efficiency during the fat removal process. This is an iterative design process accomplished using CFD prototype packages in conjunction with experimental tests and the analysis of test results, further refinement, and so on. In embodiments, the funnels are disposed in a generally linear array parallel to the augur drive shafts and/or parallel to the longitudinal axis of the cooking chamber. The funnels may be evenly spaced.

Design constraints include the dimensional limitations of the suction ports imposed by the agitators and the fat removal process time requirements.

Following completion of the fat removal process, the meat and remaining water is removed from the cooking vessel either by discharge through a specialized door system or through a clean-in-place valve. Spices, binder or other inclusions may be added at this time to ensure that no earlier added residual spice contaminates the tallow.

From the foregoing it can be seen that in a most essential aspect, embodiments of the invention include a horizontally disposed cooking vessel having an interior cooking chamber, a top cover, at least one reversible ribbon agitator in an agitator trough; a plurality of steam injectors disposed in a lower portion of said agitator trough and in fluid communication with said agitator trough; a sensor system having sensors and programmed to detect and differentiate the location and depth of layers of liquified fat, emulsion, and water within said cooking chamber; a plurality of extraction funnels disposed in an overhead portion of said cooking chamber; and an extraction funnel motor and drive system for moving said extraction funnels up and down within said cooking chamber.

Furthermore, in its most essential aspect A method of cooking meat in a cooking vessel and removing fat liquified and separated from the cooked meat during the cooking cycle, comprising the steps of providing a cooking vessel that includes: an interior cooking chamber, a top cover, at least one reversible ribbon agitator in an agitator trough; a plurality of steam injectors disposed in a lower portion of the agitator trough and in fluid communication with the agitator trough; a steam jacket disposed around a portion of the agitator trough; a sensor system having sensors and programmed to detect and differentiate the location and depth of layers of liquified fat, emulsion, and water within said cooking chamber; a plurality of extraction funnels disposed in an overhead portion of the cooking chamber and in fluid communication with a vacuum source; and an extraction funnel motor and drive system for moving the extraction funnels up and down within the cooking chamber; introducing a meat product into the cooking chamber; cooking the meat product to a temperature below 165° F.; completing the cooking process using heat provided through the steam jacket to a temperature of 165° F. or above so as to ensure that any fat in the meat has been rendered and the meat has been cooked; metering water at a temperature above 165° F. into the cooking chamber from below the meat product float the rendered fat from below; using the sensor system to locate and differentiate layers of fat, emulsion, and water; lowering the extraction funnels into the fat layer in the cooker and extracting the fat.

What is claimed as invention is:

1. A meat cooking and fat separation system, comprising:
a horizontally disposed cooking vessel having an interior cooking chamber, a top cover configured to open for the introduction of a meat product into said cooking chamber, at least one reversible ribbon agitator in an agitator trough;
a plurality of steam injectors disposed in a lower portion of said agitator trough and in fluid communication with said agitator trough so as to inject steam into said cooking chamber to heat and cook the meat product to a predetermined temperature;
at least one agitator disposed in said cooking chamber for moving and mixing the meat product during a cooking operation;
a sensor system having sensors configured to detect and differentiate the location and depth of layers of liquified fat, emulsion, and water within said cooking chamber;
a plurality of extraction funnels disposed in an overhead portion of said cooking chamber; and
an extraction funnel motor and drive system connected to said sensor system, wherein said extraction funnel motor and drive system is configured to move said plurality of extraction funnels up and down within said cooking chamber through openings on said top cover according to data from said sensor system.

2. The meat cooking and fat separation system of claim 1, wherein said cooking vessel includes first and second ribbon agitators disposed in side-by-side agitator troughs.

3. The meat cooking and fat separation system of claim 2, wherein said first and second ribbon agitators have respective drive shafts substantially parallel to one another.

4. The meat cooking and fat separation system of claim 3, wherein said steam injectors are disposed in the bottom of each of said side-by-side agitator troughs.

5. The meat cooking and fat separation system of claim 1, wherein said steam injectors are disposed in the bottom of said agitator trough.

6. The meat cooking and fat separation system of claim 1, further including a steam injection manifold in fluid communication with said steam injectors and through which steam and hot water is delivered to said steam injectors and said cooking chamber.

7. The meat cooking and fat separation system of claim 1, wherein said extraction funnels are coupled to a movable header driven by said extraction funnel motor and drive system.

8. The meat cooking and fat separation system of claim 1, wherein said sensor is a conductivity sensor.

9. The meat cooking and fat separation system of claim 1, wherein said steam injectors are spring tensioned and spring-to-close injectors which reduce turbulence and emulsifying effects of steam introduced into said cooking vessel.

10. The meat cooking and fat separation system of claim 9, wherein said steam injectors begin to open at 2 psi and are fully open at 15 psi.

11. The meat cooking and fat separation system of claim 10, wherein the flow pattern emitting from the nozzles of said steam injectors has a continuous velocity gradient.

12. The meat cooking and fat separation system of claim 1, further including a steam jacket disposed around a portion of said agitator trough.

\* \* \* \* \*